United States Patent [19]
Liang et al.

[11] Patent Number: 5,548,106
[45] Date of Patent: Aug. 20, 1996

[54] METHODS AND APPARATUS FOR AUTHENTICATING DATA STORAGE ARTICLES

[75] Inventors: Louis H. Liang, Los Altos, Calif.;
Daniel A. Marinello, Burlington, Ky.;
William J. Ryan, Underhill, Vt.

[73] Assignee: Angstrom Technologies, Inc., Florence, Ky.

[21] Appl. No.: 298,387

[22] Filed: Aug. 30, 1994

[51] Int. Cl.$^6$ .............................. G06K 7/10; G06K 7/14
[52] U.S. Cl. ..................... 235/454; 235/468; 235/472; 235/491
[58] Field of Search .................................. 235/454, 472, 235/491, 468

[56] References Cited

U.S. PATENT DOCUMENTS

| | | |
|---|---|---|
| Re. 31,302 | 7/1983 | Stambler . |
| D. 297,642 | 9/1988 | Van der Tuuk ........................ D14/107 |
| D. 298,536 | 11/1988 | Brefka ................................. D14/105 |
| D. 340,036 | 10/1993 | Connors et al. ....................... D14/105 |
| D. 340,919 | 11/1993 | Lee ...................................... D14/105 |
| D. 347,213 | 5/1994 | Bianco ................................. D21/38 |
| D. 348,052 | 6/1994 | Fennell ................................ D14/105 |
| 2,593,206 | 4/1952 | Short . |
| 2,609,928 | 9/1952 | Doust . |
| 3,105,908 | 10/1963 | Burkhardt et al. . |
| 3,305,089 | 2/1967 | Fraenkel . |
| 3,430,200 | 2/1969 | Barney . |
| 3,463,906 | 8/1969 | Chiang . |
| 3,473,027 | 10/1969 | Freeman et al. . |
| 3,492,478 | 1/1970 | Smith . |
| 3,573,731 | 4/1971 | Schwend . |
| 3,582,623 | 6/1971 | Rothery et al. . |
| 3,628,016 | 12/1971 | Berler . |
| 3,662,181 | 5/1972 | Hercher et al. . |

(List continued on next page.)

FOREIGN PATENT DOCUMENTS

WO92/08211  5/1992  WIPO .

OTHER PUBLICATIONS

Fant et al. "Infra Red Transparent Credit Card" IBM Technical Disclosure Bulletin, vol. 9, No. 7 (Dec. 1966) p. 870.
Ruth Coxeter, Ed.:"How Sour Notes Can Fight Credit Card Fraud" Business Week (Apr. 4, 1994) p. 95.
Bill Peay "In The Cards/Art Guard User" Moneycard Collector vol. 1 No. 3 (Nov. 1994) pp. 14–15.

*Primary Examiner*—Harold Pitts
*Attorney, Agent, or Firm*—Theodore R. Touw

[57] ABSTRACT

Accessory apparatus for authenticating articles is used in conjunction with existing readers or scanners of articles bearing stored data, such as credit cards or identification cards. The accessory apparatus is disposed before, after, on, under, inside, or adjacent to existing reader apparatus, to have a view of the article whose data is to be read. Information in addition to the stored data is coded on the article in non-visible indicia and is detected by the accessory authenticating apparatus. This coded additional information may be related to identification data stored in the article by the article's normal storage mechanism, such as a magnetic stripe or an embedded memory IC chip. The additional information may be coded in various combinations of predetermined characteristics of light emitted by the article to be authenticated when the article is irradiated with non-visible light from the accessory apparatus. The code combinations are preferably complex combinations of the various radiation characteristics. The article is irradiated at a high enough frequency (above 10,000 Hz modulation) for rapid determination of authenticity, and for reading and decoding standard bar codes. Visible and/or audible indicators alert a user when the authentication process detects an invalid card. With certain arrangements, an invalid card may be blocked from being read by the existing reader or scanner. The accessory apparatus may be connected to interrupt the normal communication channel of the existing reader or scanner with which it is used, when an article fails to be authenticated. The accessory apparatus may be used as an adjunct to existing readers or scanners of information on such cards or other articles, to perform authentication functions without replacing or obsoleting such existing readers or scanners.

46 Claims, 6 Drawing Sheets

U.S. PATENT DOCUMENTS

| | | | |
|---|---|---|---|
| 3,663,813 | 5/1972 | Shaw . | |
| 3,691,350 | 9/1972 | Kuhns et al. . | |
| 3,751,640 | 8/1973 | Daigle et al. . | |
| 3,764,978 | 10/1973 | Tyburski et al. . | |
| 3,767,305 | 10/1973 | Craven . | |
| 3,924,105 | 12/1975 | Gassino et al. . | |
| 4,202,491 | 5/1980 | Suzuki . | |
| 4,275,299 | 6/1981 | Favre . | |
| 4,359,633 | 11/1982 | Bianco . | |
| 4,436,991 | 3/1984 | Albert et al. | 235/468 |
| 4,500,777 | 2/1985 | Drexler | 235/487 |
| 4,538,290 | 8/1985 | Nakamura | 378/44 |
| 4,642,526 | 2/1987 | Hopkins | 315/244 |
| 4,678,898 | 7/1987 | Rudland | 235/468 |
| 4,694,148 | 9/1987 | Diekemper et al. | 235/468 |
| 4,711,996 | 12/1987 | Drexler | 235/468 |
| 4,760,247 | 7/1988 | Keane et al. | 235/454 |
| 4,795,894 | 1/1989 | Sugimoto et al. | 235/468 |
| 4,853,524 | 8/1989 | Yamaguchi et al. | 235/468 |
| 4,873,427 | 10/1989 | Virdia | 235/492 |
| 4,882,195 | 11/1989 | Butland | 427/1 |
| 4,889,365 | 12/1989 | Chouinard | 283/70 |
| 4,889,367 | 12/1989 | Miller | 283/88 |
| 4,897,531 | 1/1990 | Someya et al. | 235/440 |
| 4,908,516 | 3/1990 | West | 250/556 |
| 5,015,830 | 5/1991 | Masuzawa et al. | 235/441 |
| 5,030,832 | 7/1991 | Williams | 250/458.1 |
| 5,064,221 | 11/1991 | Miehe et al. | 283/67 |
| 5,095,194 | 3/1992 | Barbanell | 235/379 |
| 5,105,073 | 4/1992 | Kovach et al. | 235/482 |
| 5,173,597 | 12/1992 | Anglin | 235/483 |
| 5,180,901 | 1/1993 | Hiramatsu | 235/380 |
| 5,180,902 | 1/1993 | Schick et al. | 235/380 |
| 5,180,905 | 1/1993 | Chen et al. | 235/483 |
| 5,196,682 | 3/1993 | Englehardt | 235/454 |
| 5,210,411 | 5/1993 | Oshima et al. | 250/271 |
| 5,231,276 | 7/1993 | Yoshihara | 235/454 |
| 5,254,860 | 10/1993 | Yeh et al. | 250/566 |
| 5,260,552 | 11/1993 | Colbert et al. | 235/482 |
| 5,266,789 | 11/1993 | Anglin et al. | 235/483 |
| 5,270,526 | 12/1993 | Yoshihara | 235/487 |
| 5,284,364 | 2/1994 | Jain | 283/87 |
| 5,291,006 | 3/1994 | Nishiguma et al. | 235/454 |
| 5,291,027 | 3/1994 | Kita et al. | 250/566 |
| 5,304,789 | 4/1994 | Lob et al. | 235/487 |
| 5,306,899 | 4/1994 | Marom et al. | 235/382 |
| 5,311,594 | 5/1994 | Penzias | 380/23 |
| 5,317,138 | 5/1994 | Togawa | 235/454 |
| 5,321,243 | 6/1994 | Groves et al. | 235/449 |
| 5,324,926 | 6/1994 | Horiguchi et al. | 235/494 |
| 5,386,106 | 1/1995 | Kumar | 235/472 |

METHODS AND APPARATUS FOR AUTHENTICATING DATA STORAGE ARTICLES

FIELD OF THE INVENTION

This invention relates to methods and apparatus for authenticating data storage articles such as credit cards bearing recorded information. It relates particularly to auxiliary methods and to accessory apparatus that may be used as adjuncts to existing readers or scanners of information on such cards or other articles, to perform authentication functions without replacing or obsoleting such existing readers or scanners.

BACKGROUND OF THE INVENTION

With ever-increasing use of cards of various types for carrying information, for identification, and for authorizing financial transactions, there has also been an increased incidence of fraud and forgery in which counterfeit cards are used. The annual cost of credit-card forgery alone has been reported in the hundreds of millions of dollars ("Business Week" Apr. 4, 1994, page 95), despite many attempts to prevent fraud by various means to authenticate credit cards. Cards other than credit cards are used to carry coded information about the identity of individuals, their licenses to drive automobiles or to operate other equipment, their authorization for access to restricted facilities, their eligibility for various services such as medical care, etc. Such "credit card" size data storage articles include identification and security cards (driver's license, employee ID cards, badges, access control cards, immigration cards, etc.), financial and transaction cards (credit cards, debit cards, ATM cards, phone cards, subway cards, etc.), data cards (medical information, insurance and benefit information cards, car registration, etc.), telecommunication technician test cards, smart cards, computer memory cards, etc. Such cards may be subject to the same methods of counterfeiting as those used for credit cards. With technical advances and easy access to technologies such as personal computers, graphic software, image scanners, laminating equipment, credit card impact printers, instant-print cameras, and other card-making materials and equipment, a counterfeiter can easily forge such cards including most visible security features employed on them. Examples of such visible security features which can be replicated by counterfeiters are patterned backgrounds, holograms, pictures, and fingerprints. Therefore, there is a need to provide additional security features that cannot be duplicated with technologies based on visible features, and a need to provide automatic authentication that does not rely on human subjective judgment.

The current installed base of credit card readers in the U.S. and Canada alone is estimated at over 40 million units according to the American Bankers Association. World-wide installations of all types of card readers easily exceed billions of dollars in equipment value. Therefore, it is highly desirable to provide an add-on device to the existing readers that can detect invisible security features.

Thus there is an important and continuing need to prevent fraud based on counterfeit data storage articles, particularly data storage articles in the form of a card. At the same time, business enterprises and especially retail establishments, have invested in millions of card readers and/or scanners. It is highly desirable to have methods and apparatus for authentication of cards that would not require businesses to replace their existing card readers or existing scanners with a new type of authenticating reader or scanner.

NOTATIONS AND NOMENCLATURE

In this specification the expressions "non-visible light" and "non-visible radiation" will refer to light radiation with a peak wavelength outside the spectral range normally visible to the human eye. Such "non-visible light" may also include a broad enough wavelength range that a minor portion of its spectral composition may also fall within the boundaries of the visible spectrum. The visible spectrum extends from about 400 nanometers to about 700 nanometers. An example of a source of non-visible light in this sense is a high-pressure mercury lamp.

"Data storage card" and "data storage article" both refer to articles in which information is stored. Such articles need not necessarily have the form of a card, but can have other forms such as tags, badges, tapes, disks, tickets, checks, certificates, and coupons. Among those data storage articles in the form of a card or tag, the information readable by an existing reading device may be encoded in a variety of ways including magnetic stripes, characters printed in magnetic ink, characters readable by OCR equipment, embossed characters, visible or invisible bar codes, RF transponder characteristics, images, holograms, and others. The information stored in articles of other forms may be stored by any of the physical mechanisms employed for such articles.

DESCRIPTION OF THE RELATED ART

Many methods have been described for preventing counterfeiting or fraudulent use of cards bearing stored data. A few examples of these are listed here. Fant et al. described an infrared transparent credit card ("Infrared Transparent Credit Card," IBM Tech. Discl. Bulletin, Vol. 9, No. 7, December 1966, p. 870). U.S. Pat. No. 3,585,593 (Roberts, 1971) disclosed a device for identifying credit cards using coded holes punched in the card in accordance with a code given only to the legal owner of the card. Greenway (U.S. Pat. No. 4,119,361, 1978) disclosed a multilayer identification card containing fine-structure optical markings readable with infrared light through a protective layer which is opaque to lesser wavelengths. U.S. Pat. No. 4,202,491 (Suzuki, 1980) describes a data card containing data recorded with a fluorescent material that emits infrared rays when excited by infrared rays. U.S. Pat. No. 4,538,059 (Rudland, 1985) discloses an identification card with concealed coding made by infrared transparent windows of two widths providing binary coding readable by infrared radiation through material opaque to visible light. U.S. Pat. No. 4,694,148 (Diekemper et al., 1987) shows an access card having coded markings which appear in an infrared receiver under infrared radiation, having a photosensitive layer, and having a surface layer not transparent to visible light. U.S. Pat. No. 4,873,427 (Virdia, 1989) uses a plastic card with an integrated memory circuit and with infrared-transparent layers over identification codes readable by transmission of infrared light.

In U.S. Pat. No. 4,897,531 (1990), Someya et al. disclose a data identifying system that reads a data card magnetic stripe, and reads an optical ROM card containing data regarding invalid cards to determine whether the data card is invalid. U.S. Pat. No. 4,908,516 (West, 1990) discloses apparatus and a process that irradiates an article such as a card having magnetic data storage with predetermined radiation and determines whether detected radiation has prescribed spectral characteristics. West's apparatus controls an integral magnetic detecting head according to the result of radiation detection. U.S. Pat. No. 4,972,476 (Nathans, 1990) discloses an ID card bearing a scrambled facial image. U.S. Pat. No. 5,095,194 (Barbanell, 1992) discloses a holographic credit card that stores a unique identification such as a fingerprint of the authorized user in the form of a hologram. U.S. Pat. No. 5,104,149 (Hoppe, 1992) has a security print covering the surroundings of a signature field and extending continuously across the signature field as well. U.S. Pat. No. 5,151,582 (Fujioka, 1992) uses light-emitting elements and image sensors of reflected light to read and check the embossed information on a card. Gross et al., (PCT Publication No. WO 92/08211, 1992) describe an access control device using a number of machine-readable data substrates bearing access authorizations in coded form, but readable only by different reading devices. U.S. Pat. No. 5,180,901 (Hiramatsu, 1993) discloses a pressure sensor and an authenticity sensor arranged on the surface of an IC card. U.S. Pat. No. 5,180,902 (Schick et al., 1993) shows a self-verifying transaction card having a self-contained keyboard or keypad. U.S. Pat. No. 5,202,930 (Livshitz et al., 1993) uses correlation function analysis on the dynamics of a sample and reference signatures. U.S. Pat. No. 5,216,233 (Kassens, 1993) uses an RF identification label alone or with any of a series of scanner modules for data capture. U.S. Pat. Nos. 5,270,526 and 5,321,276 (Yoshihara, 1993) show card-type recording media having plural types of inks which normally exhibit the same color visually, but have different optical characteristics under a predetermined condition provided in blocks in a desired pattern. U.S. Pat. No. 5,239,166 (Graves, 1993) uses secure data interchange between an intelligent card and a terminal, and uses erasure of data upon an invalid response. U.S. Pat. No. 5,305,383 (Guillou et al., 1994) uses a system of numbered tokens with a chip card for electronic payment. U.S. Pat. No. 5,311,594 (Penzias, 1994) describes a system using pre-stored authentication information, randomly requested of a card user at each transaction. U.S. Pat. No. 5,317,137 (Wilkins, 1994) discloses a system which magnetically writes a security code simultaneously with magnetic reading of a card, and validates or re-validates the card only if the same security code is present before completion of a transaction. U.S. Pat. No. 5,334,823 (Noblett, Jr. et al., 1994) discloses a system and methods for operating a data card terminal which include an embossed character reader, a magnetic stripe reader, and a signature-capture printer which digitizes and compresses signals corresponding to the signature of a card-holder.

Ronald S. Indeck et al. describe a method of detecting and analyzing a "signature" pattern of the minute magnetic particles of which a magnetic stripe is composed, which can be used for authenticating cards [Ruth Coxeter, ed. "How Sour Notes Can Fight Credit Card Fraud" Business Week, Apr. 4, 1994, p. 95; G. Mian et al. "Noise Correlation of Magnetic Thin Film Media" Japanese Journal of Applied Physics, Part 2 (Letters) Vol. 30. No. 8B, pp. L1483–L1485 (Aug. 15, 1991); and J. R. Hoinville et al. "Spatial Noise Phenomena of Longitudinal Magnetic Recording Media" IEEE Transactions on Magnetics, Vol. 28 No. 6, pp. 3398–3406, November 1992].

Various technologies such as surface acoustic wave (SAW) technology, encrypted radio-frequency-activated circuits, and encrypted integrated circuits have been proposed as counterfeit protection features for the above-mentioned data storage articles. These offer many advantages, such as high memory capacity for data, field programmability, extended detection range, no requirement for "line of sight" communication, and an ability to provide personalized codes.

Many inventions have been made using light-emitting materials and corresponding dedicated detection systems. U.S. Pat. No. 4,642,526 (Hopkins, 1987) discloses an object recognition system using modulated ultraviolet light produced by a self-modulated lamp. U.S. Pat. No. 4,889,365 (Chouinard, 1989) discloses a counterfeit resistant label made by applying a selected code word as a series of marks in several locations on the label (using ink sensitive to light in the non-visible spectrum), and by masking the ink visibility at all of the locations. U.S. Pat. No. 4,889,367 (Miller 1989) has a multi-readable information system, using bar codes in an ink readable by light of a first wavelength and using human-readable symbols printed on the same area with humanly visible ink.

A persistent problem in the related art is that the solutions require revolutionary change in reading equipment and installation of new equipment. Not only do the previously proposed solutions require very substantial investment in new technologies and equipment, but also many require obsolescence of existing data reading or processing apparatus and related systems.

PROBLEMS SOLVED BY THE INVENTION

The problems solved by this invention include, among others, the inadvertent acceptance of fraudulent data storage articles counterfeited by readily available replication methods. These data storage article include all the types of credit, debit, and identification cards mentioned above. While there have been other solutions to this problem, this invention avoids the high cost of prior solutions that require expensive cards, or entirely new card readers, and the high cost of obsoleting existing reader equipment that is still functional. This is solved by having apparatus retrofitable to existing readers. Another problem solved is the reliance on subjective human judgment required to detect and recognize visible authentication markings. The use of complex authentication criteria which are also non-visible, rather than simpler criteria using only one or two visible variables, further enhances the reliability of the present solution in detecting counterfeit data cards and the like. The problems of slow authentication and/or unreliable recognition of bar codes or other indicia are solved by the use of high frequency modulation in the present invention.

OBJECTS AND ADVANTAGES OF THE INVENTION

A general object of this invention is to provide improved security in systems using data storage articles. A particular object of this invention is a method for authenticating data storage articles for use in conjunction with existing data readers. A related object is an apparatus that can be used in conjunction with existing card readers for authenticating data storage cards. Another related object is an apparatus that can be used in conjunction with existing scanners of bar codes or of OCR-recognizable characters. Other related objects are methods and apparatus that can be used to augment the counterfeit-protection security of systems using existing card readers, scanners and information processing systems. Yet another object of this invention is to add the capability of detecting invisible codes to existing systems that scan visible indicia on data storage articles. A related object is to augment the capabilities of existing card reading, scanning, and information processing systems by allowing reading of additional information from data storage cards. Another object is to provide improved detection capability to existing card readers, scanners and information processing systems. Related objects are methods and apparatus that can operate in conjunction with various types of existing card reading, scanning, and information processing systems, which read various types of data, and which utilize various physical principles. Other objects are authentication methods and apparatus that do not obsolete existing card reading or scanning apparatus and do not require them to be replaced. Another object is authentication apparatus that can be installed with no modification or with only minimal modification of existing card reading, scanning, or information processing equipment. Another object is authentication apparatus that can operate at high speed, to allow timely determination of authenticity while a data storage article is being read by an existing reader. Another object is authentication apparatus that utilizes existing communication capabilities of existing card reading, scanning, or information processing equipment. Other objects are authentication methods and apparatus that can prevent the completion of a transaction by existing card reading, scanning, or information processing equipment when a data storage article is not authenticated. Another object is a physically compact authentication apparatus. Another object is an apparatus that is easy to align with existing card readers, scanners, or information processing equipment. Another object is authentication apparatus that is relatively inexpensive to manufacture and to install.

SUMMARY OF THE INVENTION

Accessory apparatus for authenticating articles is used in conjunction with existing readers or scanners of articles bearing stored data, such as credit cards or identification cards. The accessory apparatus is disposed before, after, on, under, inside, or adjacent to existing reader apparatus, to have a view of the article whose data is to be read. Information in addition to the stored data is coded on the article in non-visible indicia and is detected by the accessory authenticating apparatus. This coded additional information may be related to identification data stored in the article by the article's normal storage mechanism, such as a magnetic stripe or an embedded memory chip. The additional information may be coded in various combinations of predetermined characteristics of light emitted by the article to be authenticated when the article is irradiated with non-visible light from the accessory apparatus. The code combinations are preferably complex combinations of the various radiation characteristics. Particularly useful characteristics are unique combinations of wavelengths, combinations of absolute or relative intensities, emission time delays, and spatial patterns such as bar-codes or array codes. The article is irradiated at a high enough frequency (above 10,000 Hz modulation) for rapid determination of authenticity, and for reading and decoding standard bar codes. Visible and/or audible indicators alert a banker, merchant or other user when the authentication process detects an invalid card. With certain arrangements, an invalid card may be blocked from being read by the existing reader. The accessory apparatus may be connected to interrupt the normal communication channel of the existing reader or scanner with which it is used, when an article fails to be authenticated.

Other objects, features, and advantages will become apparent from the detailed description of the preferred embodiment examples and their illustrations in the drawings.

DETAILED DESCRIPTION OF THE PREFERRED EMBODIMENTS

The authentication method of the present invention is intended to be used with existing card-reading means, such as existing "swipe readers" commonly used to read credit cards or debit cards. The data storage cards used in this method have at least two sets of indicia or codes containing data. One set consists of the indicia or codes readable by existing card-reading means. A second set consists of indicia that are invisible when irradiated with light in the visible spectrum but are detectable when irradiated with non-visible light. An add-on apparatus is used to irradiate data storage cards with non-visible light, detecting the non-visible indicia to determine the authenticity (or lack of authenticity) of the data storage card. In one variation of the method, each data storage card is exposed to the existing card-reading means to read the codes that the existing reader can read, and the resulting output of the existing reader is either allowed to pass or blocked. In another variation, the existing reader is allowed to read each data storage card only if that data storage card is authentic. This is accomplished by physically blocking entry of the card from the existing reader with a mechanical stop actuated by a failed authentication signal, by sending an enabling signal to the existing reader, or by controlling the power input to the existing reader. In a method where the existing reader is allowed to read the card and its normal data output is allowed to pass, an authentication code can be added to that data stream. The authentication code can be as short as one binary bit appended or prefixed to the existing reader output, indicating either authentication or failure of authentication. One simple method of determining authenticity utilizes a pre-defined relationship between the codes read by the existing reader and the non-visible codes read by the add-on apparatus, giving a positive authentication result if the relationship is true for the specific data storage card being tested.

In general, the detection or reading of the non-visible codes by the add-on apparatus can occur before, after, or simultaneously with reading of the visible of magnetic codes by the existing reader. In a preferred method, the non-visible codes are detected by modulating the non-visible light at a predetermined high frequency (preferably above 10,000 Hertz), and the fluorescent light excited by the irradiation is selectively detected at the modulation frequency. All of the methods described above can be used with existing readers of many types, including magnetic stripe readers, optical character recognition (OCR) readers, bar-code scanners, magnetic character readers, CD-ROM drives, and the like.

Figure 1:
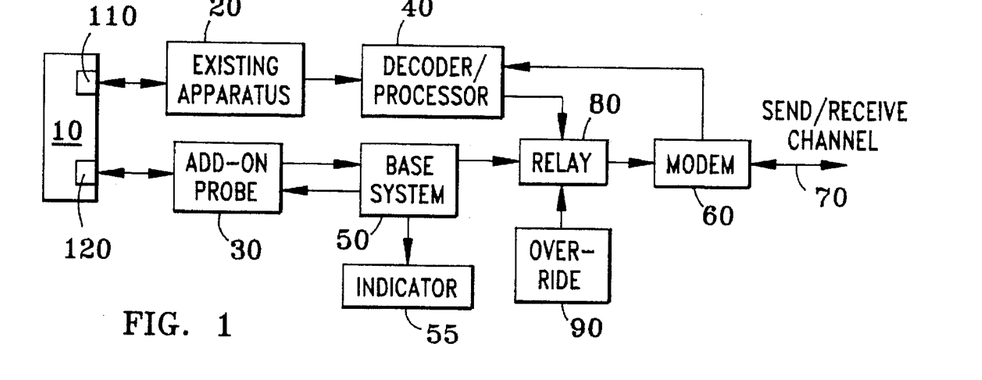
FIG. 1 is a functional schematic diagram of a first embodiment made in accordance with the present invention.

FIG. 1 is a functional schematic diagram illustrating a first embodiment of apparatus made in accordance with the present invention. An existing reader 20 normally reads a data storage article 10, such as a credit or identification card, typically making use of magnetic or optical coding of the data stored in data storage article 10. Data storage article 10 bears two kinds of information: the existing stored data 110 typically coded in magnetic or visible optical form, and additional indicia 120 made for the purpose of authentication by the present invention. Indicia 120 are not visible when illuminated only by light in the visible spectrum. They may be designated "non-visible codes." The existing reader apparatus 20 has an existing decoder 40, which typically processes signals detected by existing reader to decode the signals into digital data. Decoder 40 may be and often is an integral part of existing reader apparatus 20, but is shown as distinct in FIG. 1 to clarify its function. In existing applications, decoder 40 would normally be connected directly to a modem 60 or to a communication terminal to communicate the decoded data to a remote location for authorization of a transaction, using a communication channel 70, which could be a telephone connection to a remote computer, for example. For understanding the invention, it is convenient to think of the example of an existing reader 20 as a magnetic stripe reader, with a slot through which a user such as a retail merchant passes a credit card. Its decoder 40 might be integrated in the same outer housing, and it might communicate with a remote host computer through a modem 60 when a merchant dials to the remote computer.

In accordance with the present invention, an add-on probe 30 is attached to existing reader 20, or placed adjacent to it as shown in FIG. 1. Add-on probe 30 must have an optical view of at least a selected portion of data storage article 10 for both irradiation of that portion and detection of light from it. Add-on probe 30 acts in conjunction with the existing reader 20, and with a base system 50, a relay switch 80, and an over-ride 90 to authenticate a data storage article 10 presented to the existing reader 20. Add-on probe 30 comprises a housing, a high-frequency modulated source of non-visible light, one or more detectors of fluorescent light excited by that light source, an optical system including wavelength-selective filters, fiber-optic elements carrying both the non-visible irradiating light and the fluorescent light excited by it, and a wiring cable carrying both excitation for the light source from base system 50 and detected signals to base system 50. Base system 50 comprises a source of excitation for the irradiating source, electronic signal processing circuitry, an indicator 55, and at least one electrical output. Indicator 55 may be an audible indicator and/or a visible display for indicating to the user whether or not the data card or other data storage article was authenticated. Over-ride 90 allows a user to over-ride normal operation by manual intervention in unusual circumstances, such as equipment malfunction or direct authorization of a transaction. Base system 50 may be integrated with add-on probe 30 in a single housing. In any event, the housing of add-on probe 30 is adapted to fit the physical characteristics of existing reader 20 as later examples will show in more detail.

In FIG. 1, base system 50 communicates with relay switch 80, which gates the normal output from existing decoder 40, which is typically a communication output. If the electronic signal processing circuitry of base system 50 produces a positive authentication signal, relay switch 80 passes the output of decoder 40 to modem 60. If base system 50 fails to authenticate the card, relay switch 80 may block the transmission of data from decoder 40 to modem 60, and may also send a "failed authentication" signal to modem 60 in place of (or in addition to) the existing reader's data, to be transmitted over communication channel 70 to a remote location. Simply blocking the transmission of data from the existing reader can prevent the transaction from being completed with an invalid card, but transmission of the data in addition to a failed authentication signal can inform the remote computer of the association of that data with failed authentication. That combined information can be used to prevent further authorizations for the same invalid card in future transactions.

Add-on probe 30 and base system 50 may be constructed using high frequency modulated sources, wavelength-selective filters, optical components, fluorescent-light detectors, and signal-processing electronics as described below with reference to FIGS. 3, 12, 13 and 14. It will be apparent from those descriptions that various ways of partitioning the apparatus between add-on probe 30 and base system 50 are possible.

Figure 2:
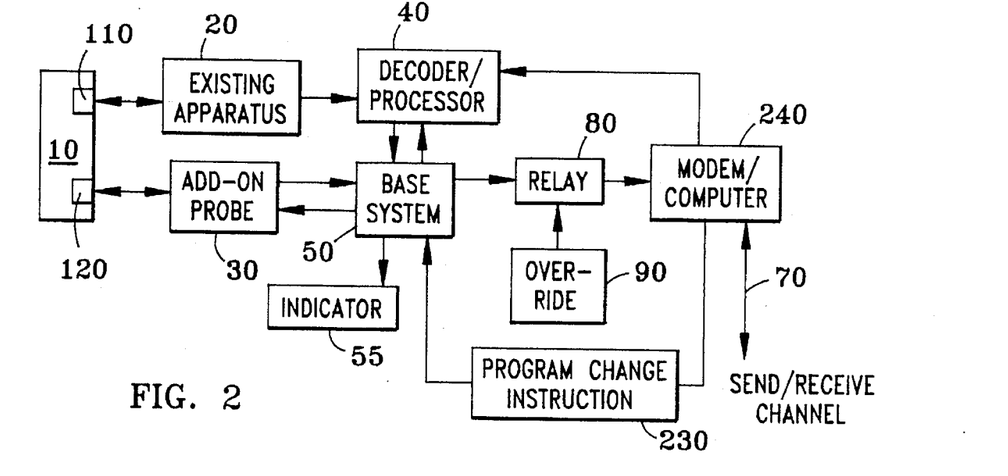
FIG. 2 is a functional schematic diagram of a second embodiment.
Figure 3:
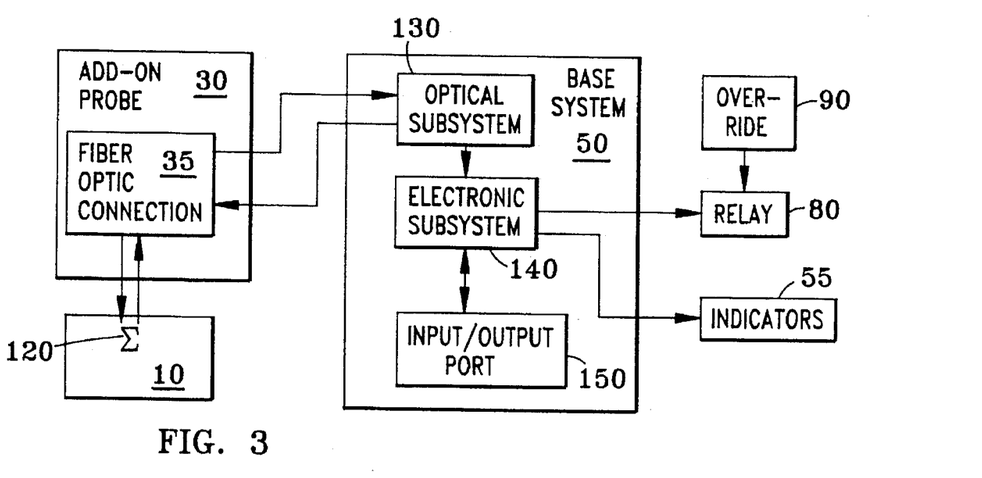
FIG. 3 is a functional schematic diagram of a first preferred embodiment.

FIG. 2 is a functional schematic diagram of a second embodiment. The embodiment illustrated in FIG. 2 operates similarly to that of FIG. 1, except that a provision is added for changing the program of base system 50 upon instructions 230 transmitted from a host computer or remote terminal through modem 240. In an application to existing apparatus, such as an ATM machine having a local computer controller, that computer may be used to transmit instructions 230 to base system 50.

The major functional components of the apparatus of this invention may be partitioned between an add-on probe 30 and a base system 50 in a number of ways for different applications. For most common applications, the first preferred embodiment has the partitioning shown in FIG. 3, which illustrates what is believed to be the best mode of practicing the invention. In the partitioning shown in FIG. 3, only a fiber-optic connection 35 is within the add-on probe 30, carrying non-visible irradiating light to the data storage card 10 and carrying fluorescent light from non-visible codes 120 on the data storage card back to base system 50. All other major components are in base system 50. Base system 50 comprises an optical subsystem 130, an electronic subsystem 140, and its input/output port 150. Electrical connections are made from electronic subsystem 140 to relay 80 and to indicators 55.

Figure 4:
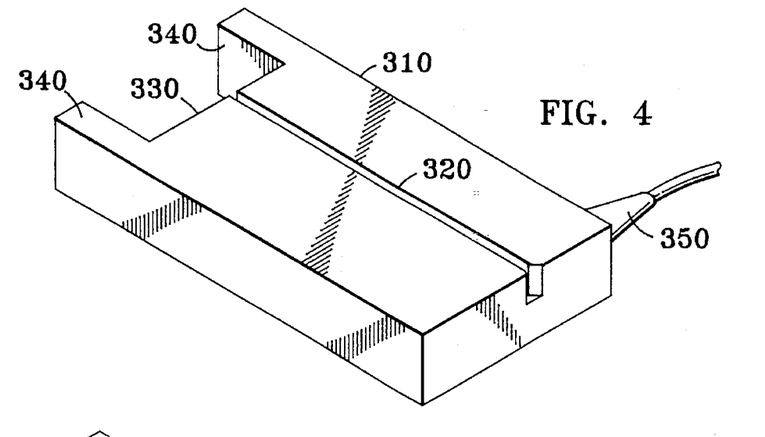
FIG. 4 is a perspective drawing of a second preferred embodiment.
Figure 5:
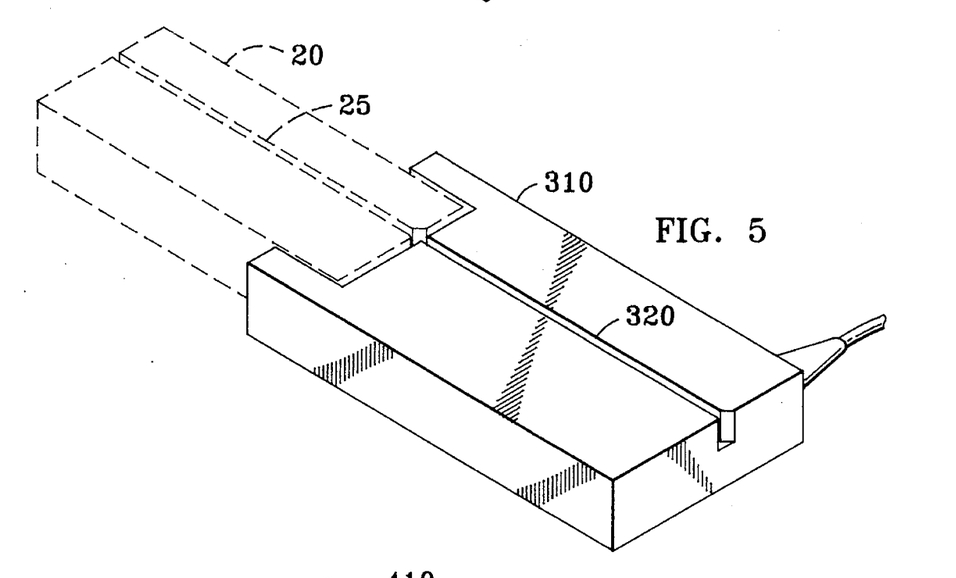
FIG. 5 is a perspective drawing showing the embodiment of FIG. 4 in relation to the existing apparatus with which it is used.

FIG. 4 is a perspective drawing of a second preferred embodiment in which a housing 310 containing the functional elements of add-on probe 30 is adapted to fit against an existing reader 20 and automatically align to it. Housing 310 has a slot 320 similar to a slot in an existing magnetic or optical reader 20. Extended portions 340 of housing 310 surround two sides of a recess 330 which fits existing reader 20, and slot 320 is situated to align with slot 25 of existing reader 20, when housing 310 and existing reader 20 are adjacent. An interconnecting cable 350 connects add-on probe 30 to base system 50. FIG. 5 illustrates the embodiment of FIG. 4 in relation to the existing apparatus 20 with which it is used. (Existing apparatus 20 is shown with dashed lines.) This embodiment is used "upstream" of an existing reader: i.e. the data storage article is passed through the slot 320 before passing through slot 25. Slot 320 contains in at least one of its side walls the optical interface needed for add-on probe 30. In one arrangement of the type of apparatus shown in FIG. 4, illumination of the data storage article by non-visible light and detection of fluorescent light from invisible codes 120 is done on the surface of the article opposite the surface used for its existing magnetic or visible optical data. Fasteners of various types may be used to hold housing 310 and existing reader 20 together if needed. For example the housings could be attached with double-sided adhesive tape to a common base plate extending under both housings.

Figure 6:
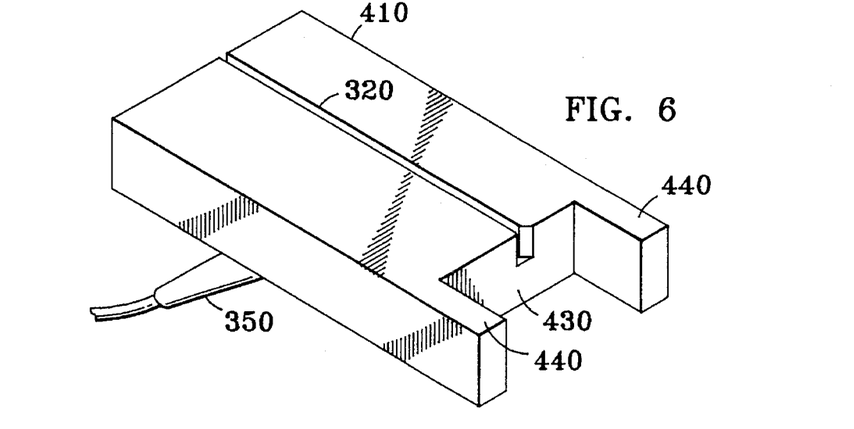
FIG. 6 is a perspective drawing of a third preferred embodiment.
Figure 7:
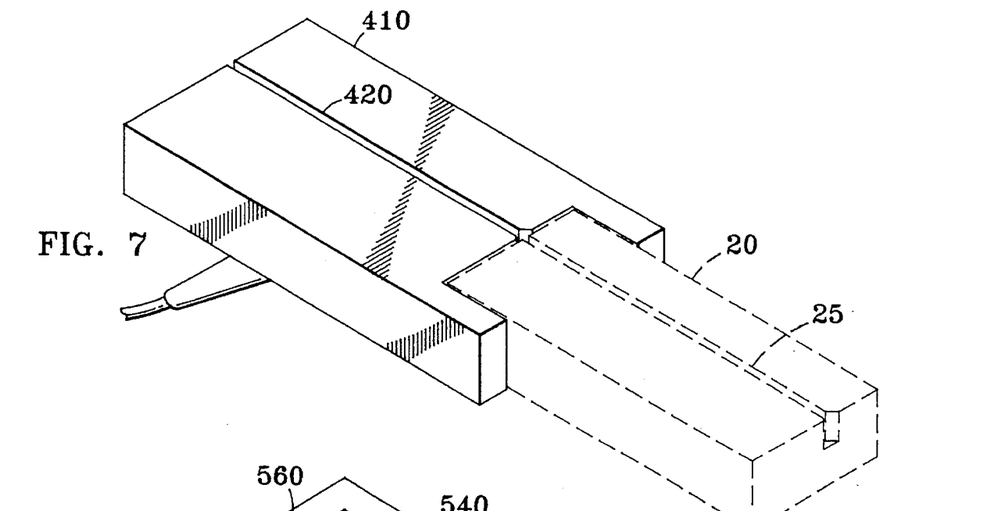
FIG. 7 is a perspective drawing showing the embodiment of FIG. 6 in relation to the existing apparatus with which it is used.

FIG. 6 is a perspective drawing of a third preferred embodiment. This embodiment is similar to that of FIG. 4, but is designed to be used "downstream" from the existing reader: the data storage article is passed through ("swiped" through) slot 320 after passing through slot 25 of existing reader 20. Interconnecting cable 350 is shown at the bottom surface of housing 410 to illustrate an alternative arrangement of the light source and detector or fiber-optical link(s). In this embodiment, interconnecting cable 350 may be a fiber-optic cable. The light source and detector or fiber-optical link(s) may be positioned to illuminate an edge of the data storage card and to detect light excited at the card edge. This arrangement is used with cards having invisible coding incorporated within a card in such a way that they are detectable at an edge of a card. Such cards might have coded fluorescent substances incorporated into all of the card substrate material or might have discrete layers incorporating invisible codes detectable at their edges. There is no causal or other relationship between the two features illustrated in FIG. 6 (downstream swipe and edge illumination/detection) that would require them to be used together in the same embodiment. FIG. 7 is a perspective drawing showing the embodiment of FIG. 6 in relation to the existing apparatus 20 with which it is used.

Figures 8, 9:
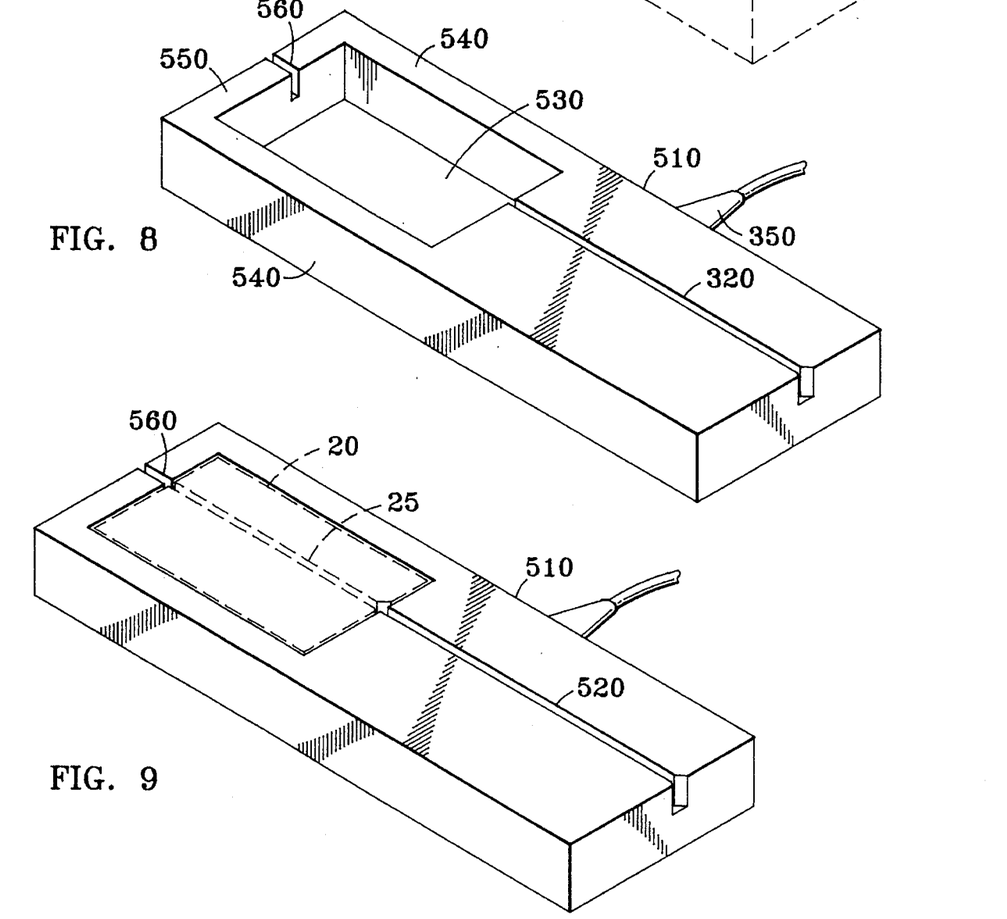
FIG. 8 is a perspective drawing of a fourth preferred embodiment.
FIG. 9 is a perspective drawing showing the embodiment of FIG. 8 in relation to the existing apparatus with which it is used.

FIG. 8 is a perspective drawing of a fourth preferred embodiment. Housing 510 is similar to both housing 310 of FIG. 4 and housing 410 of FIG. 6, but has an aperture 530 designed to contain and hold the entire existing reader 20. Side portions 540 and end portion 550 enclose the aperture to hold the existing reader 20 in place as illustrated in FIG. 9. Slot 560 aligns with the slot 25 of existing reader 20 to provide an entrance or exit path for a data card or the like. Slot 320 also aligns with slot 25 and contains in a side wall the optical interface needed for the add-on probe 30. FIG. 9 is a perspective drawing showing the embodiment of FIG. 8 in relation to the existing apparatus with which it is used. The embodiment of FIG. 8 and FIG. 9 may be used either upstream or downstream of existing reader 20.

Figure 10:
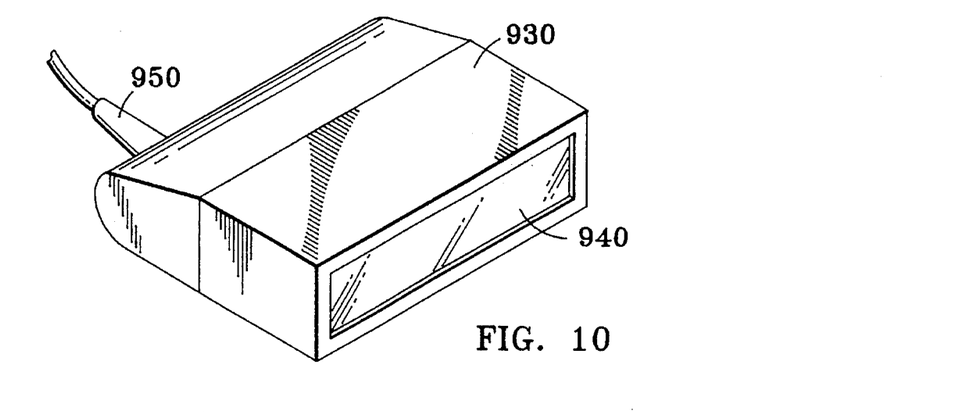
FIG. 10 is a perspective drawing of a fifth preferred embodiment.
Figure 11:
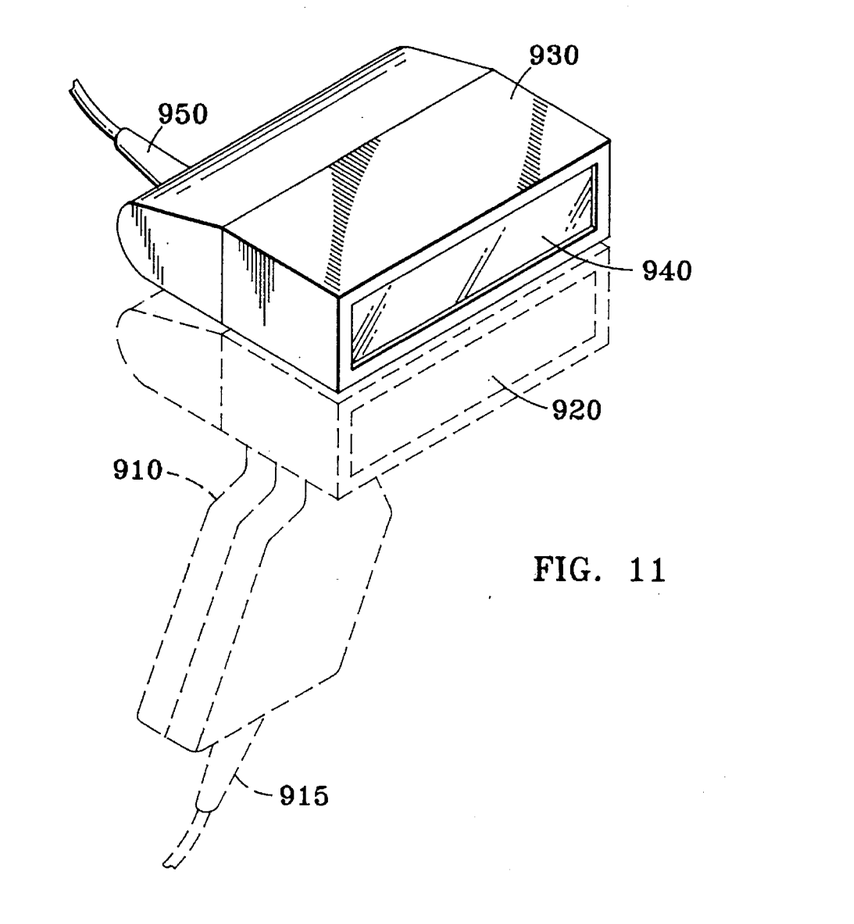
FIG. 11 is a perspective drawing showing the embodiment of FIG. 10 in relation to the existing apparatus with which it is used.

FIG. 10 is a perspective drawing of a fifth preferred embodiment for use with an existing optical scanner, and FIG. 11 is a perspective drawing showing the embodiment of FIG. 10 in relation to the existing optical scanner apparatus. The embodiment of FIG. 10 has a housing 930 with a window 940 and an interconnecting cable 950. Housing 930 contains an add-on probe 30, which in this embodiment incorporates a scanning function. Existing scanner 910 has a window 920 and interconnecting cable 915. Add-on probe housing 930 is attached to the existing scanner housing to align window 940 with existing scanner window 920, so that the scanner of add-on probe 30 can scan the same article being scanned by the existing scanner.

Figure 12:
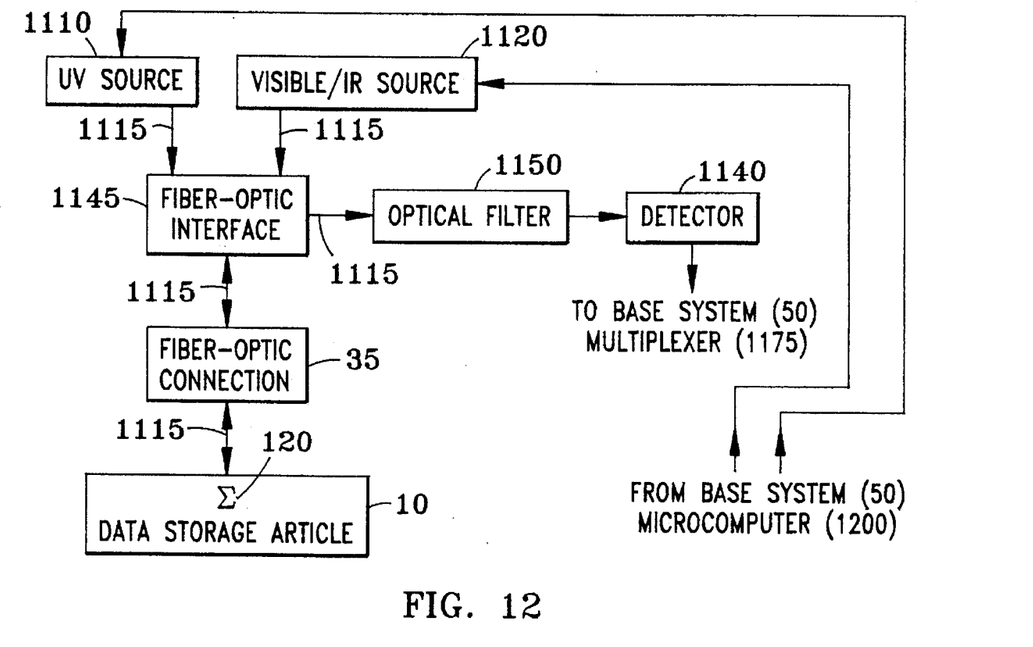
FIG. 12 is a schematic diagram of an embodiment of an optical subsystem made in accordance with the invention.

FIG. 12 is a schematic diagram of an embodiment of an optical subsystem 130 made in accordance with the invention. In the embodiment of FIG. 12, add-on probe 30 includes the entire optical subsystem 130 shown. This is a different partitioning from the preferred partitioning shown in FIG. 3 and is used here for clarity in describing the optical subsystem.

A data storage article 10 is moving through or past add-on probe 30, and carries non-visible codes 120. The optical subsystem 130 of FIG. 12 has a modulated source 1110 of non-visible light, and may optionally have a modulated source 1120 of visible and/or infrared light as well. Source 1110 may be a UV source such as a high-pressure mercury lamp, for example. In FIG. 12, the electrical excitation of non-visible light source 1110 (and optionally 1120) comes from base system 50. Non-visible light source 1110 may be self-modulating as in Hopkins U.S. Pat. No. 4,642,526. Non-visible light propagates through optical path 1115, fiber-optic interface 1145, and fiber-optic connection 35 to illuminate data storage article 10. (Fiber-optic elements may be used for other parts of optical path 1115 as well.) Fiber-optic interface 1145 may include a lens, aperture, or slit, as may the output end of fiber-optic connection 35. Fiber-optic connection 35 also carries fluorescent light excited by the non-visible light back along optical path 1115 into add-on probe 30. With suitable fiber material and construction, the same optical fiber may be used for both non-visible irradiation light and for the fluorescent light emitted by non-visible codes 120. An optical filter 1150 selects a portion of the fluorescent light to be detected by a detector 1140. The electrical output of detector 1140 is sent to base system 50 for interpretation, as described below with reference to FIG. 13.

Figure 13:
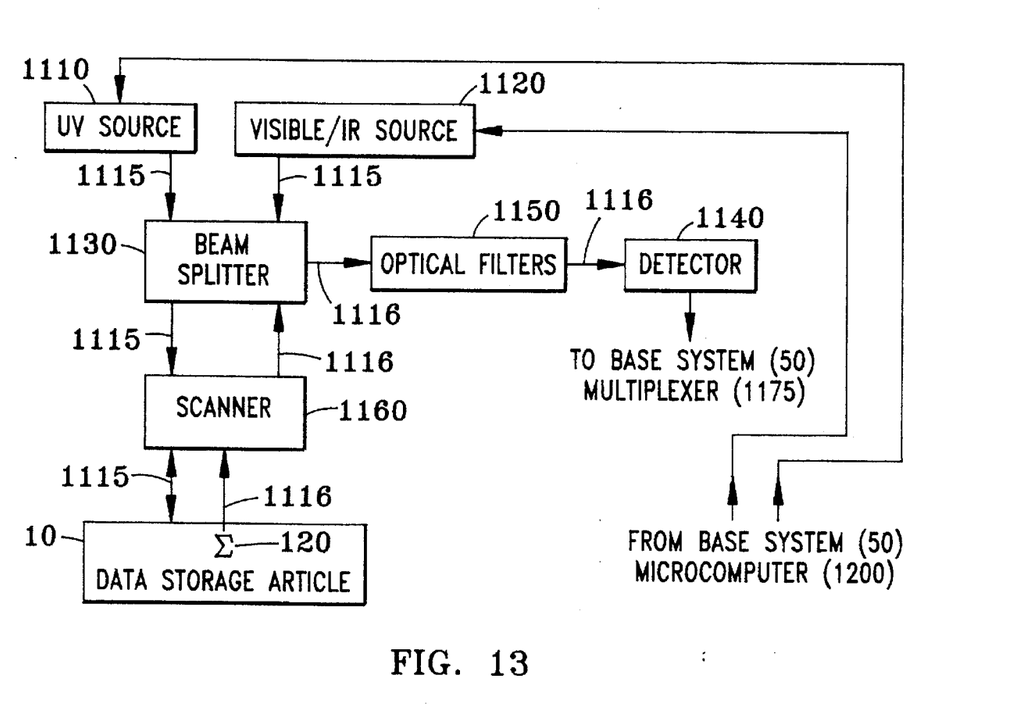
FIG. 13 is a schematic diagram of another embodiment of an optical subsystem

FIG. 13 is a schematic diagram of another embodiment of an optical subsystem 130. As in FIG. 12, add-on probe 30 includes the entire optical subsystem. For the purpose of describing this subsystem, data storage article 10 is assumed to be stationary. This embodiment has a scanner 1160 for scanning a beam of non-visible light across a selected portion of data storage article 10. Scanner 1160 may be an oscillating mirror, for example, or any conventional scanner suitable for the non-visible irradiating light from source 1110. FIG. 13 also shows optional beam splitter 1130, optionally plural optical filters 1150, and optionally plural detectors 1140. Fluorescent light from non-visible codes 120 propagates along return optical path 1116. With either singular or plural detectors 1140, each detector has an output signal channel, carried to base system 50 via an interconnecting cable. As in the embodiment of FIG. 12, fiber-optic elements may be used for portions of optical path 1115 or return optical path 1116.

Figure 14:
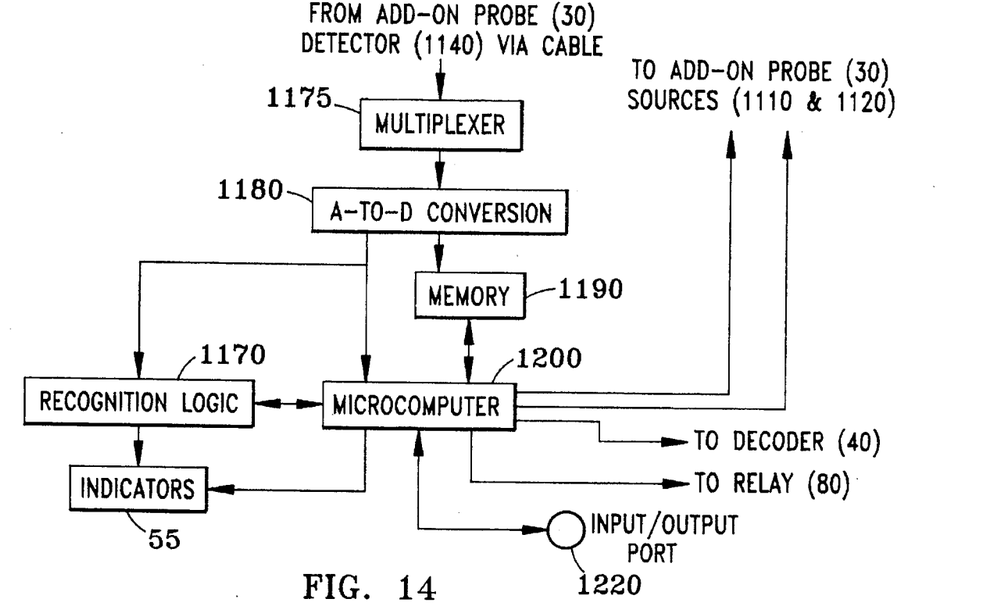
FIG. 14 is a schematic diagram of an electronic subsystem used in an embodiment.

FIG. 14 is a schematic diagram of electronic subsystem 140 used in an embodiment of base system 50. Base system 50 has an input signal from the detector of 1140 of add-on probe 30. In versions that have multiple detectors 1140, a multiplexer 1175 multiplexes signals from the various detectors channels. In versions with only a single detector, multiplexer 1175 is unnecessary. At analog-to-digital converter 1180 the detector analog signals are converted to digital signals. The digital signals are sent as inputs to memory 1190, microcomputer 1200 and recognition logic 1170, which interpret the digital signals to determine whether the invisible codes 120 detected correspond to authentic data storage articles. That determination is made under control of a program stored in a program memory associated with microcomputer 1200. Memory 1190, microcomputer 1200 and recognition logic 1170 are shown here as distinct elements, but it will be appreciated that their functions may all be performed by a microcomputer with on-board memory and particularly by a digital signal processor (DSP). The recognition logic or its equivalent microcomputer program uses conventional recognition algorithms to recognize the codes represented by invisible codes 120. The result of determining authenticity of the data storage article is either positive (authenticated) or negative (not authenticated). The result is indicated to a user of this apparatus by indicators 55, preferably both audible and visible indicators. At the same time, the authentication result is used to control relay 80. In the simplest method, relay 80 is used either to allow the output of existing reader 20 to pass to modem 60 if the authentication result is possible, or to block that output if the authentication result is negative. In other methods, the authentication result may be appended or prefixed to the normal output of existing reader 20, to inform a host system of the authentication result. Input/output port 1220 allows any input or output of microcomputer 1200, but especially for re-programming of the instructions of microcomputer 1200, such as in using the program change instructions 230 of FIG. 2.

While the invention has been described in terms of particular partitioning of functions between an add-on probe 30 and a base system 50, these partitionings were made to describe the invention more clearly. The various functions can be partitioned differently between these two major portions of the apparatus without changing the operation of the invention. One way of re-partitioning the apparatus is to keep only a fiber-optic element as add-on probe 30, and partition all other components of the apparatus into base system 50. Another way of re-partitioning the apparatus is to put all of the elements in a single housing acting as the add-on probe 30, and integrating the base system 50 elements into that single housing.

Figure 15:
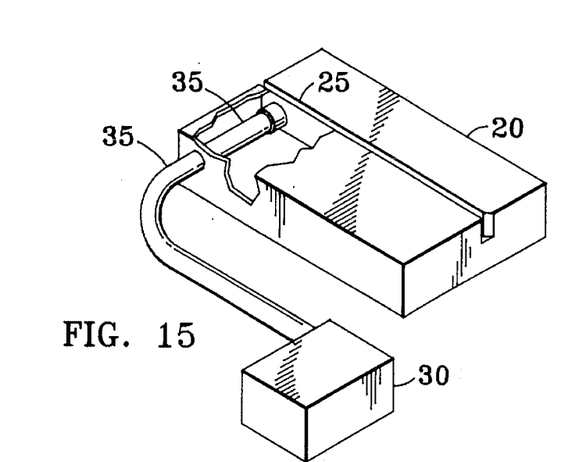
FIG. 15 is a partially cutaway perspective drawing of a detail of an alternative embodiment.

FIG. 15 is a partially cutaway perspective drawing of a detail of an alternative embodiment in which add-on probe 30 has an optical fiber connection 35 to existing reader 20. Optical fiber connection 35 passes through a hole drilled in the housing of existing reader 20, and terminates in a suitable optical terminal at the wall of slot 25. The termination of optical fiber connection 35 may include a lens, aperture, or slit. The terminated end of optical fiber connection 35 is disposed to illuminate a data storage card passing through slot 25 and to transmit fluorescent light from invisible codes 120 on the data storage card back to an optical filter 1150 and a detector 1140 in add-on probe 30.

Figure 16:
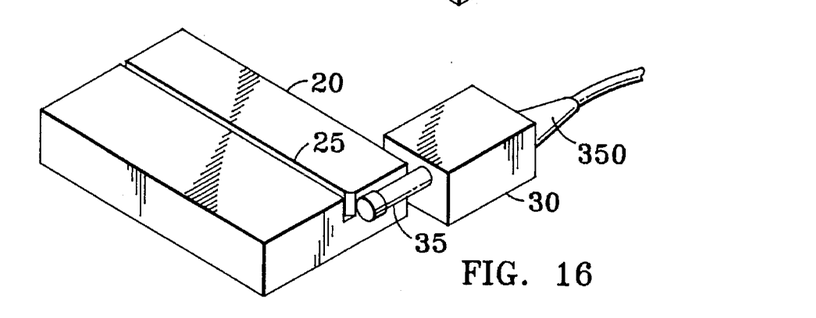
FIG. 16 is a perspective drawing of a detail of another alternative embodiment.

FIG. 16 is a perspective drawing of a detail of another alternative embodiment, in which optical fiber connection 35 is disposed adjacent to either the entrance end or exit end of slot 25 in existing reader 20.

When any of these embodiments are used, add-on probe 30 is placed adjacent to existing conventional reader 20 or attached to it. Most of the versions of add-on probe 30 align automatically with the slot or with the scan field of existing reader 20 (or 910). Otherwise add-on probe 30 is aligned to allow the same data storage article, such as a data card, to be read by both the existing reader and add-on probe 30. The normal output of existing reader 20 is routed through relay 80 as illustrated in FIGS. 1 or 2. Operation of base system 50 is automatic, and may be programmed to either block the output of existing reader 20 when a data storage article is not authenticated, or to augment reader 20 output with an authentication code. An alternative method of using the invention is to allow a host system to make the determination of authenticity on the basis of information transmitted by base system 50. This may be done, for example, by comparing detected invisible codes 120 with predetermined codes, or with information codes received in the same transmission from existing reader 20, or by using some combination of these codes.

Other embodiments of the invention will be apparent to those skilled in the art from a consideration of this specification or from practice of the invention disclosed herein. For example, the data storage articles to which the invention may be applied need not be cards, but can be any type of articles bearing data, such as computer magnetic storage disks, CD-ROM disks, magnetic digital data tapes, video tapes, video disks, game cartridges, analog or digital audio tapes, bank checks, event admission tickets, transportation tickets, passes, food stamps, and coupons. In each case the apparatus and methods of this invention may be adapted as an adjunct to the existing equipment without extensive modification of the existing equipment or at least without obsoleting the existing equipment. It is intended that the specification and examples be considered as exemplary only, with the true scope and spirit of the invention being defined by the following claims.

Having described our invention, we claim:

1. A method for authenticating data storage cards for use in conjunction with existing card-reading means, comprising the steps of:

a) providing data storage cards bearing at least two sets of indicia including first indicia that are invisible when irradiated with light in the visible spectrum but are detectable when irradiated with non-visible light and second indicia readable by said existing card-reading means, b) irradiating said data storage cards with said non-visible light, c) detecting said first indicia to determine the authenticity or lack thereof for each of said data storage cards, and d) optionally exposing each of said data storage cards to said existing card-reading means to read said second indicia.

2. A method as in claim 1 for authenticating data storage cards for use in conjunction with existing card-reading means, wherein said exposing step (d) is performed only if each said data storage card is authentic.

3. A method as in claim 1 for authenticating data storage cards for use in conjunction with existing card-reading means, further comprising the step of:

e) indicating authenticity or lack thereof for each of said data storage cards according to the result of said detecting step (c).

4. A method as in claim 1 for authenticating data storage cards for use in conjunction with existing card-reading means, wherein said irradiating step (b) further comprises the step of modulating said non-visible light at a predetermined frequency, and said detecting step (c) further comprises the step of selectively detecting fluorescent light at said predetermined frequency.

5. A method as in claim 4 for authenticating data storage cards for use in conjunction with existing card-reading means, wherein said predetermined frequency is equal to or greater than 10,000 Hertz.

6. A method as in claim 1 for authenticating data storage cards for use in conjunction with existing card-reading means, wherein said detecting step (c) further comprises the step of comparing said first and second indicia according to predetermined criteria.

7. A method as in claim 1 for authenticating data storage cards for use in conjunction with existing card-reading means, wherein said exposing step (d) is performed before said irradiating and detecting steps (b) and (c).

8. A method as in claim 1 for authenticating data storage cards for use in conjunction with existing card-reading means, wherein said exposing step (d) is performed after said irradiating and detecting steps (b) and (c).

9. A method as in claim 1 for authenticating data storage cards for use in conjunction with existing card-reading means, wherein said exposing step (d) is performed simultaneously with said irradiating and detecting steps (b) and (c).

10. A method as in claim 1 for authenticating data storage cards for use in conjunction with existing card-reading means, wherein said providing step (a) includes providing at least said second indicia in magnetic patterns, and said exposing step (d) is performed by using existing card-reading means capable of reading magnetic patterns and by reading said second indicia magnetically.

11. A method as in claim 1 for authenticating data storage cards for use in conjunction with existing card-reading means, wherein said providing step (a) includes providing at least said second indicia in a magnetic stripe, and said exposing step (d) is performed by using existing card-reading means capable of reading a magnetic stripe and by reading said second indicia magnetically.

12. A method as in claim 11 for authenticating data storage cards for use in conjunction with existing card-reading means, wherein said existing card-reading means has a slot, and wherein said exposing step (d) is performed using existing card-reading means by moving said magnetic stripe through said slot of said existing card-reading means.

13. A method as in claim 1 for authenticating data storage cards for use in conjunction with existing card-reading means, wherein said providing step (a) includes providing at least said second indicia as an optical bar code, and said exposing step (d) is performed by using existing card-reading means capable of reading an optical bar code and by reading said second indicia optically.

14. A method as in claim 13 for authenticating data storage cards for use in conjunction with existing card-reading means, wherein said exposing step (d) is performed using existing card-reading means to scan said optical bar code.

15. A method as in claim 1 for authenticating data storage cards for use in conjunction with existing card-reading means, wherein said providing step (a) includes providing at least said second indicia as optical characters, and said exposing step (d) is performed by using existing card-reading means capable of reading and recognizing optical characters, by reading said second indicia optically, and by recognizing said optical characters.

16. A method as in claim 1 for authenticating data storage cards for use in conjunction with existing card-reading means, wherein said existing card-reading means has an existing output, further comprising the steps of (f) enabling said existing output if each of said data storage cards is authentic, and (g) blocking said existing output if each of said data storage cards is not authentic, respectively.

17. A method as in claim 8 for authenticating data storage cards for use in conjunction with existing card-reading means, further comprising the steps of (h) allowing said exposing step (d) for each of said data storage cards if it is authentic, and (i) preventing said exposing step (d) for each of said data storage cards if it is not authentic, respectively.

18. A method as in claim 17 for authenticating data storage cards for use in conjunction with existing card-reading means, wherein said allowing step (h) is performed by allowing each of said data storage cards to enter said existing card-reading means if it is authentic, and said preventing step (i) is performed by preventing each of said data storage cards from entering said existing card-reading means if it is not authentic, respectively.

19. A method as in claim 17 for authenticating data storage cards for use in conjunction with existing card-reading means, wherein said allowing step (h) is performed by providing a first electrical input to enable said existing card-reading means, and said preventing step (i) is performed by providing a second electrical input to disable said existing card-reading means, respectively.

20. A method as in claim 17 for authenticating data storage cards for use in conjunction with existing card-reading means, wherein said allowing step (h) is performed by providing electrical power to said existing card-reading means, thereby enabling operation of said existing card-reading means, and said preventing step (i) is performed by withholding electrical power from said existing card-reading means, thereby disabling operation of said existing card-reading means, respectively.

21. An apparatus for authenticating data storage cards for use in conjunction with existing card-reading means, comprising:

a) a housing having first and second ends and a card slot communicating between said first and second ends, said card slot being adapted for alignment with said existing card-reading means, b) a source of irradiating light characterized by having a peak wavelength outside the visible spectrum, said source being adapted for irradiating said data storage cards while they are within said card slot, c) one or more detectors of light emitted by said data storage cards in response to said irradiating light, each of said detectors producing a first electrical signal depending on one or more characteristics of said emitted light, d) signal processing means responsive to at least one of said first electrical signals to produce a second electrical signal indicative of the authenticity of said data storage cards, and e) output means responsive to said second electrical signal to indicate authenticity status of said data storage cards.

22. An apparatus as in claim 21 for authenticating data storage cards for use in conjunction with existing card-reading means, wherein said output means comprises a visible indicator recognizable by a human user of the apparatus.

23. An apparatus as in claim 21 for authenticating data storage cards for use in conjunction with existing card-reading means, wherein said output means comprises an audible signal recognizable by a human user of the apparatus.

24. An apparatus as in claim 21 for authenticating data storage cards for use in conjunction with existing card-reading means, wherein said output means comprises an electrical output recognizable by said existing card-reading means.

25. An apparatus as in claim 24 for authenticating data storage cards for use in conjunction with existing card-reading means, wherein said electrical output comprises an electrical power input for energizing said existing card-reading means.

26. An apparatus as in claim 21 for authenticating data storage cards for use in conjunction with existing card-reading means, wherein said existing card-reading means has an existing slot, and said card slot is aligned with said existing slot in said existing card-reading means.

27. An apparatus as in claim 21 for authenticating data storage cards for use in conjuncnon with existing card-reading means, wherein said first end of said housing is disposed so that said data storage cards may pass through said card slot before entering said existing card-reading means.

28. An apparatus as in claim 21 for authenticating data storage cards for use in conjunction with existing card-reading means, wherein said first end of said housing is disposed so that said data storage cards may pass through said card slot after exiting said existing card-reading means.

29. An apparatus for authenticating data storage articles for use in conjunction with existing article-scanning means, comprising:
   a) a housing having a window and means for attaching said housing to said existing article-scanning means, said housing being adapted for alignment with said existing article-scanning means,
   b) a source of irradiating light characterized by having a peak wavelength outside the visible spectrum, adapted for irradiating said data storage articles through said window in said housing,
   c) one or more detectors of light emitted through said window by said data storage articles in response to said irradiating light, each of said detectors producing a first electrical signal depending on one or more characteristics of said emitted light,
   d) signal processing means responsive to at least one of said first electrical signals to produce a second electrical signal indicative of the authenticity of said data storage articles, and
   e) output means responsive to said second electrical signal to indicate authenticity status of said data storage articles.

30. An apparatus for authenticating data storage cards for use in conjunction with existing card-reading means, comprising:
   a) a first light guide characterized by being transmissive to non-visible light, said first light guide being adapted for irradiating said data storage cards with said non-visible light while said existing card-reading means are in use,
   b) a second light guide characterized by being transmissive to fluorescent light emitted by said data storage cards in response to said non-visible light, said second light guide being adapted for transmitting said fluorescent light while said existing card-reading means are in use,
   c) a source of said non-visible light characterized by having a peak wavelength outside the visible spectrum, said source being adapted for irradiating said data storage cards through said first light guide,
   d) one or more detectors adapted for detecting said fluorescent light emitted through said second light guide by said data storage cards in response to said irradiating light, each of said detectors producing a first electrical signal depending on one or more characteristics of said emitted fluorescent light,
   e) signal processing means responsive to at least one of said first electrical signals to produce a second electrical signal indicative of the authenticity of said data storage cards, and
   f) output means responsive to said second electrical signal to indicate authenticity status of said data storage cards.

31. An apparatus as in claim 30 for authenticating data storage cards for use in conjunction with existing card-reading means, wherein said first light guide (a) and said second light guide (b) are combined in a single light guide characterized by being transmissive to both said non-visible light and said fluorescent light.

32. An apparatus as in claim 30 for authenticating data storage cards for use in conjunction with existing card-reading means, wherein said first light guide (a) and said second light guide (b) are combined in a single fiber-optic cable characterized by having fibers transmissive to both said non-visible light and said fluorescent light.

33. An apparatus as in claim 21, wherein said source of irradiating light is selected from the list consisting of a high-pressure mercury vapor lamp, a non-visible laser, a non-visible light-emitting diode, and a non-visible arc lamp.

34. An apparatus as in claim 29, wherein said source of irradiating light is selected from the list consisting of a high-pressure mercury vapor lamp, a non-visible laser, a non-visible light-emitting diode, and a non-visible arc lamp.

35. An apparatus as in claim 30, wherein said source of irradiating light is selected from the list consisting of a high-pressure mercury vapor lamp, a non-visible laser, a non-visible light-emitting diode, and a non-visible arc lamp.

36. An apparatus as in claim 21, wherein said signal processing means comprise:
   a) an analog-to-digital converter for converting said first electrical signal to digital form,
   b) a memory for storing at least said digital form of said first electrical signal,
   c) recognition logic for recognizing said digital form of said first electrical signal, and
   d) a microcomputer for generating said second electrical signal indicative of the authenticity of said data storage cards.

37. An apparatus as in claim 29, wherein said signal processing means comprise:
   a) an analog-to-digital converter for converting said first electrical signal to digital form,
   b) a memory for storing at least said digital form of said first electrical signal, c) recognition logic for recognizing said digital form of said first electrical signal, and d) a microcomputer for generating said second electrical signal indicative of the authenticity of said data storage articles.

38. An apparatus as in claim 30, wherein said signal processing means comprise:

a) an analog-to-digital converter for converting said first electrical signal to digital form, b) a memory for storing at least said digital form of said first electrical signal, c) recognition logic for recognizing said digital form of said first electrical signal, and d) a microcomputer for generating said second electrical signal indicative of the authenticity of said data storage cards.

39. An apparatus as in claim 21, wherein said signal processing means comprise a digital signal processor.

40. An apparatus as in claim 29, wherein said signal processing means comprise a digital signal processor.

41. An apparatus as in claim 30, wherein said signal processing means comprise a digital signal processor.

42. An apparatus as in claim 30, wherein said first and second light guides are inserted through holes in said existing card-reading means.

43. An apparatus as in claim 31, wherein said single light guide is inserted through a hole in said existing card-reading means.

44. An apparatus as in claim 32, wherein said fiber-optic cable is inserted through a hole in said existing card-reading means.

45. An apparatus as in claim 21, wherein said existing card-reading means are selected from a list of reading means consisting of magnetic stripe readers, magnetic tape readers, magnetic character readers, optical character readers, IC card readers, memory card readers, game cartridge readers, bar-code scanners, CCD scanners, CD-ROM readers, and RF tag readers.

46. An apparatus for authenticating data storage articles for use in conjunction with existing article-reading means, comprising:

a) a housing, said housing being adapted to be aligned with said existing article-reading means;

b) a source of irradiating light characterized by having a peak wavelength outside the visible spectrum, said source being adapted to irradiate said data storage articles;

c) one or more detectors of light emitted by said data storage articles in response to said irradiating light, each of said detectors producing a first electrical signal depending on one or more characteristics of said emitted light;

d) signal processing means responsive to at least one of said first electrical signals to produce a second electrical signal indicative of the authenticity of said data storage articles; and e) output means responsive to said second electrical signal to indicate authenticity status of said data storage articles.

* * * * *